United States Patent [19]
Wolfram

[11] Patent Number: 5,941,560
[45] Date of Patent: Aug. 24, 1999

[54] METHOD AND SYSTEM FOR PROTECTING CHILD SEAT PASSENGERS

[75] Inventor: Berthold G. Wolfram, Belleville, Mich.

[73] Assignee: Siemens Automotive Corporation, Auburn Hills, Mich.

[21] Appl. No.: 08/870,154

[22] Filed: Jun. 5, 1997

[51] Int. Cl.⁶ .............................. B60R 21/32; B60D 1/28
[52] U.S. Cl. ............................ 280/735; 180/271; 701/45
[58] Field of Search ........................... 280/735; 180/271, 180/273; 297/344.1, 217.3; 701/45

[56] References Cited

U.S. PATENT DOCUMENTS

| | | | |
|---|---|---|---|
| 5,071,160 | 12/1991 | White et al. | 280/735 |
| 5,439,249 | 8/1995 | Steffens, Jr. et al. | 280/735 |
| 5,454,591 | 10/1995 | Mazur et al. | |
| 5,468,014 | 11/1995 | Gimbel et al. | |
| 5,474,327 | 12/1995 | Schousek | |
| 5,515,933 | 5/1996 | Meyer et al. | |
| 5,528,698 | 6/1996 | Kamei et al. | |
| 5,529,372 | 6/1996 | Cohen | |
| 5,544,914 | 8/1996 | Borninski et al. | |
| 5,549,323 | 8/1996 | Davis | |
| 5,570,903 | 11/1996 | Meister et al. | |
| 5,605,348 | 2/1997 | Blackburn et al. | |
| 5,612,876 | 3/1997 | Zeidler et al. | |
| 5,748,473 | 5/1998 | Breed et al. | 364/424.055 |
| 5,790,031 | 8/1998 | Shelton et al. | 340/572 |

*Primary Examiner*—Lanna Mai
*Assistant Examiner*—Faye M. Fleming

[57] ABSTRACT

A method and system for protecting child restraint seat passengers placed in a front passenger seat of a vehicle having an air bag restraint system includes a sensor for sensing the presence of a child restraint seat on the front passenger seat of the vehicle and providing an output signal indicating such presence; and a control for controlling the front passenger seat drive actuator to drive the front passenger seat toward a rearward position or an indicator for informing the driver that the front passenger seat should be placed in a proper position.

9 Claims, 1 Drawing Sheet

METHOD AND SYSTEM FOR PROTECTING CHILD SEAT PASSENGERS

FIELD OF THE INVENTION

This invention relates to vehicle occupant compartment safety and more particularly to a method and system for facilitating the rearward positioning of an adjustable front passenger seat upon sensing the presence of a child seat thereon to provide better protection for the child against a vehicle air bag deployed during a crash.

BACKGROUND OF THE INVENTION

It is known in the art relating to vehicle occupant safety to sense the presence of a child seat placed in the front passenger seat for purposes of modifying or preventing the deployment of an air bag restraint. Many types of sensors have been developed and air bag restraint systems continue to become more intelligent.

In vehicles without such sensors, when a child seat is placed on the front passenger seat, it is generally a rear facing seat having its high side closest to the passenger side air bag. If the seat is too close, the deployment of the air bag is adversely affected and may cause either harm to the child or failure to adequately protect the child.

It is desirable to have detonation of an air bag restraint and to have the child seat and front seat moved to its most rearward position so that the air bag deployment is most efficiently effected.

SUMMARY OF THE INVENTION

The present invention provides a method and system for sensing the presence of a child restraining seat on a vehicle front passenger seat and responding to the sensed presence of such a child seat.

In accordance with the invention, a system is provided for automatically moving the front passenger seat toward a rearward position in response to the sensed presence of a child restraint seat thereon. Alternatively, in the case of a manually moveable front passenger seat, the driver is informed that the front passenger seat is not in its proper position or that it should be moved in response to the sensed presence of a child restraint seat thereon. This alternative embodiment can also be combined with electrically powered front passenger seats that can be moved automatically.

The system includes a sensor for sensing the presence of a child restraint seat on the front passenger seat of the vehicle and provides an output signal. Such sensors include weight distribution, optical and other sensors as are known. A processor is in communication with the sensor and processes the outputted signal of the sensor. A control, operatively connected to the processor, controls a seat actuator to drive the front passenger seat toward a rearward position upon actuation of the vehicle ignition and the detection of a child restraint seat on the front passenger seat.

A seat position sensor may be employed to provide a signal indicating the position of the front passenger seat. The seat position signal can be compared with the child restraint seat presence signal so that the appropriate action can be taken.

Alternatively, if the front passenger seat is manually positionable, an indicator is actuated to alert the driver to position the front passenger seat in its rearward position upon actuation of the vehicle ignition and the detection of a child restraint seat on the front passenger seat. Such an indicator may be visual or audible and may take the form of a telltale on the vehicle dashboard or may be a bell or buzzer.

These and other features and advantages of the invention will be more fully understood from the following detailed description of the invention taken together with the accompanying drawings.

DETAILED DESCRIPTION OF THE INVENTION

Figure 1:
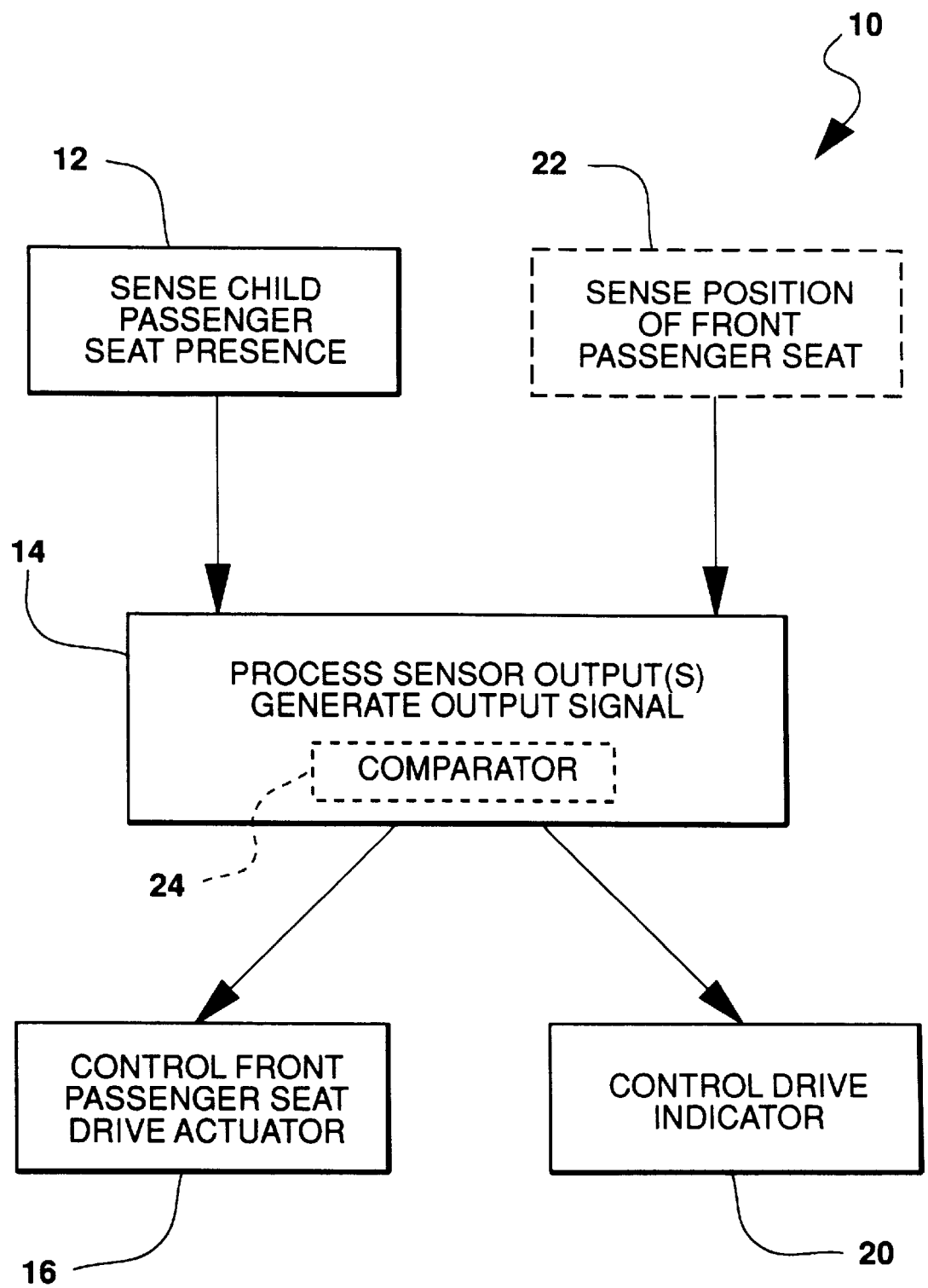
FIG. 1 is a schematic view of a method and system for protecting a child passenger restraint seat on a vehicle front passenger seat in accordance with the present invention.

Referring now to the drawings in detail, numeral 10 generally indicates a system for protecting a child seated in a child restraint seat placed on the front passenger seat of a vehicle having an air bag restraint system. As is hereinafter more fully described, the system 10 controls a powered front passenger seat and/or provides a driver warning or alert to indicate to the vehicle driver that a child restraint seat is in the front passenger seat and/or that the front passenger seat is not in its recommended position.

The system 10 includes a presence sensor 12, for sensing the presence of a child restraint seat on the front passenger seat of the vehicle. Such sensor 12 types include weight, optical, or restraint as are known and provide an output signal indicating the presence of a child restraint seat. A processor 14 processes the outputted presence signal and generates an output signal in response to the sensed presence. A control 16 controls the front passenger seat drive actuator on vehicles equipped with powered front passenger seats to drive the front passenger seat rearwardly in response to the detected presence of a child restraint seat.

In vehicles having manually operated front passenger seats, a control 20 actuates a driver indicator when the presence of the child restraining seat is sensed. Such indicators may be a telltale on the vehicle dashboard or audible indicator such as a bell or buzzer as are known.

The system 10 may also include a position sensor 22 for sensing the position of the front passenger seat of the vehicle and providing an output signal indicating such position. This front passenger seat position signal can be compared, by a comparator 24 as part of the processor 14, with a recommended front passenger seat position when a child restraint seat is positioned on the front passenger seat. The processed signal can be used to generate an output signal to drive the front passenger seat to its recommended position or to alert the driver that the front passenger is or is not in its recommended position.

In vehicles having a powered front passenger seat without a seat position sensor 22, it is preferable to have the control 16 drive the front passenger seat to its rearward most position in order to protect a child in a child restraint seat. In vehicles having a seat position sensor 22, there may be a position of the front passenger seat, not its most rearward position, that is a preferable position to obtain the maximum effect of a deployed airbag.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A method for protecting child restraint seat passengers placed in a front passenger seat of a vehicle having an air bag restraint system, the method comprising the steps of:

sensing the presence of a child restraint seat on the front passenger seat of the vehicle and providing an output signal indicating such presence;

sensing the position of the front passenger seat and providing an output signal indicating such position;

processing the outputted signals; and controlling one of a front passenger seat drive actuator and a driver indicator when the presence of the child restraining seat is sensed on the front passenger seat and the seat is not in its recommended position.

2. The method of claim 1 wherein controlling said front passenger seat drive actuator includes driving said front passenger seat rearwardly.

3. The method of claim 2 wherein driving said front passenger seat rearwardly includes driving said front passenger seat to its rearward most position.

4. The method of claim 1 wherein controlling a driver indicator includes actuating an alarm to alert a driver that said front passenger seat is not in its proper position.

5. A system for protecting child restraint seat passengers placed in a front passenger seat of a vehicle having an air bag restraint system, the system comprising:

a presence sensor for sensing the presence of a child restraint seat on the front passenger seat of the vehicle and providing an output signal indicating such presence;

a position sensor for sensing the position of the front passenger seat of the vehicle and providing an output signal indicating such position;

a processor for processing the outputted presence and position signals; and a control for controlling one of a front passenger seat drive actuator and a driver indicator when the presence of the child restraining seat is sensed on the front passenger seat and the said seat is not in its recommended position.

6. The system of claim 5 wherein said processor includes a comparator for comparing said actual seat position with the recommended seat position when the presence of a child restraint seat is sensed.

7. A method for protecting child restraint seat passengers placed in a front passenger seat of a vehicle having an air bag restraint system and a powered seat position adjuster, the method comprising the steps of:

sensing the presence of a child restraint seat on the front passenger seat of the vehicle and providing an output signal indicating such presence; and controlling the front passenger seat drive actuator to drive the front passenger seat toward a rearward position.

8. The method of claim 7 wherein the step of driving said front passenger seat rearwardly includes driving said front passenger seat to its rearward most position.

9. The method of claim 7 including the step of indicating to a vehicle driver that the front passenger seat is not in its recommended position.

* * * * *